US011634591B2

(12) United States Patent
Lu et al.

(10) Patent No.: US 11,634,591 B2
(45) Date of Patent: Apr. 25, 2023

(54) SAG RESISTANT, FORMALDEHYDE-FREE COATED FIBROUS SUBSTRATE

(71) Applicant: ARMSTRONG WORLD INDUSTRIES, INC., Lancaster, PA (US)

(72) Inventors: Lida Lu, Coraopolis, PA (US); Kenneth G. Caldwell, Mountville, PA (US)

(73) Assignee: AWI Licensing LLC, Wilmington, DE (US)

( * ) Notice: Subject to any disclaimer, the term of this patent is extended or adjusted under 35 U.S.C. 154(b) by 268 days.

(21) Appl. No.: 16/031,025

(22) Filed: Jul. 10, 2018

(65) Prior Publication Data

US 2018/0312700 A1   Nov. 1, 2018

Related U.S. Application Data

(63) Continuation of application No. 12/970,011, filed on Dec. 16, 2010, now Pat. No. 10,017,648.

(51) Int. Cl.
| | |
|---|---|
| C09D 5/02 | (2006.01) |
| E04C 2/24 | (2006.01) |
| C09D 133/02 | (2006.01) |
| C09D 7/63 | (2018.01) |
| E04C 2/16 | (2006.01) |
| C08K 5/053 | (2006.01) |
| C09D 125/08 | (2006.01) |

(52) U.S. Cl.
CPC ............ *C09D 5/024* (2013.01); *C09D 7/63* (2018.01); *C09D 133/02* (2013.01); *E04C 2/16* (2013.01); *E04C 2/246* (2013.01); *C08K 5/053* (2013.01); *C09D 125/08* (2013.01); *Y10T 428/251* (2015.01); *Y10T 428/31507* (2015.04); *Y10T 428/31739* (2015.04); *Y10T 428/31786* (2015.04); *Y10T 428/31931* (2015.04); *Y10T 428/31935* (2015.04); *Y10T 428/31971* (2015.04)

(58) Field of Classification Search
None
See application file for complete search history.

(56) References Cited

U.S. PATENT DOCUMENTS

| | | | | |
|---|---|---|---|---|
| 3,245,933 A | * | 4/1966 | Muskat | C08F 8/32 524/388 |
| 3,538,039 A | * | 11/1970 | Lantz | C08G 59/686 523/466 |
| 3,547,412 A | * | 12/1970 | Klages | C04B 16/08 366/6 |
| 6,146,746 A | | 11/2000 | Bernd et al. | |
| 6,221,973 B1 | * | 4/2001 | Arkens | C08F 8/14 525/327.7 |
| 6,331,350 B1 | | 12/2001 | Taylor et al. | |
| 6,403,052 B1 | | 6/2002 | Morita | |
| 6,547,868 B1 | * | 4/2003 | Belmares | C04B 26/02 524/425 |
| 7,034,072 B2 | * | 4/2006 | Milic | C08G 18/6254 427/385.5 |
| 10,017,648 B2 | * | 7/2018 | Lu | C09D 7/63 |
| 2003/0175478 A1 | * | 9/2003 | Leclercq | E04B 1/942 428/105 |
| 2004/0039098 A1 | * | 2/2004 | Belmares | C04B 41/483 524/449 |
| 2004/0069020 A1 | | 4/2004 | Hindi et al. | |
| 2005/0087837 A1 | | 4/2005 | Mitsuhiro et al. | |
| 2005/0202224 A1 | | 9/2005 | Helbing | |
| 2005/0214534 A1 | | 9/2005 | Adamo et al. | |
| 2007/0055012 A1 | | 3/2007 | Caldwell | |
| 2010/0029160 A1 | * | 2/2010 | Srinivasan | D06M 15/233 442/327 |
| 2010/0330376 A1 | * | 12/2010 | Trksak | C08L 83/00 428/426 |

FOREIGN PATENT DOCUMENTS

| | | |
|---|---|---|
| CA | 2037214 | 9/1991 |
| CN | 1950422 A | 4/2007 |
| EP | 1391443 | 2/2004 |
| WO | 2005/087837 A1 | 9/2005 |
| WO | 2007149644 | 12/2007 |
| WO | 2010114626 | 10/2010 |

OTHER PUBLICATIONS

Corresponding Office Action dated Jul. 17, 2014, in CN 201180065606. 8, Filed: Dec. 15, 2011.
Patent Examination Report No. 2, dated Dec. 23, 2014, in corresponding AU Application No. 2011341733.0, filed Dec. 15, 2011. AU.
EP Search Report for corresponding EP Application No. 11849313. 9, dated Jan. 29, 2015. EP.

\* cited by examiner

*Primary Examiner* — Tae H Yoon
(74) *Attorney, Agent, or Firm* — Craig M. Sterner

(57) ABSTRACT

The present invention relates to an improved formaldehyde-free coated fibrous substrate. The coating includes a cross-linked binder system which forms three dimensional networks when heat cured. After the coating is applied to the back of fibrous substrate and cured, the coating is capable of hygroscopic expansion which imparts excellent anti-sag properties. The coating is compatible with other coating systems with neutral or mild alkaline pH. The improvement being the binding system is neutralized with a volatile base so that it evaporates quickly so as not to hinder the cross-linking reaction.

19 Claims, No Drawings

SAG RESISTANT, FORMALDEHYDE-FREE COATED FIBROUS SUBSTRATE

CROSS-REFERENCE TO RELATED APPLICATIONS

This application is a continuation of U.S. patent application Ser. No. 12/970,011 filed on Dec. 16, 2010, and issued as U.S. patent Ser. No. 10/017,648. The disclosure of the above application is incorporated herein by reference.

BACKGROUND

The present invention is related to coated panels, and, in particular, to a formaldehyde-free coating that is applied to a major exterior surface of a fibrous panel to resist sag.

Fibrous substrates are light weight, porous composite materials which are used for many different purposes including panels in suspended ceiling systems. They are produced from a water based slurry mixture containing fibers, a binding system and other additives. Fibers, which are typically used as reinforcing materials, include mineral wool, glass and cellulosic fibers. Binding systems, which hold the fibers and other additives together, include starches, latex, reconstituted paper products and other polymeric materials. Other additives include fillers such as expanded perlite, clay, etc.

It is widely known in the art that varying the material percentages of the aforementioned components ultimately impacts the physical and mechanical properties of the fibrous substrate, particularly when the fibrous substrate is installed in a horizontally extending suspended ceiling system. For example, it is well known to those skilled in the art that after installation into a suspended ceiling framework, a fibrous substrate has a tendency to sag when exposed to high humidity environment due to the hydrophilic nature of certain components of the core substrate. e.g. water soluble polymer binders (e.g. starch) and cellulosic fibers (e.g. newsprint). More specifically, after absorbing moisture, the substrate loses its modulus and sags by its gravity. Thus, conventional wisdom is that as the material percentages of these hydrophilic components are increased, the sag performance of the substrate decreases.

There have been various attempts to improve or even eliminate sag in these conventional fibrous substrates. One known method is to apply a hygroscopic coating on one of the major exterior surfaces of the substrate. More specifically, such coating includes a binder system which is hydrophilic and capable of absorbing moisture with rising humidity and desorbing moisture with decreasing humidity. Thus, when humidity rises, the hygroscopic coating absorbs moisture and expands in its volume and dimension, thus creating an expansion force on the surface of the substrate to which the coating is applied. In essence, the coating counter-acts the compressive force caused by the humid conditions.

In order to resist the compressive force from the underlying fibrous acoustic panel at high relative humidity, not only must the back coating be hygroscopic and create an expansion force, it is further required for the coating to maintain a high modulus. It is well understood in the art that polymer modifications are necessary for the hydrophilic polymer to maintain a high modulus after absorbing high level of moisture. One known method of polymer modification is by means of crosslinking. Once the polymer is properly crosslinked, the polymer matrix expansion will be limited, and, in turn, the polymer softening, i.e. loss of modulus, at high humidity conditions will be minimized.

Additionally, there are several known formaldehyde-free compositions for use as binders for making fibrous substrates. For example, U.S. Pat. Nos. 6,221,973 and 6,331,350 describe a formaldehyde-free fiberglass binder including a polyacid, such as polyacrylic acid, and a polyol, such as glycerol, diethanolamine, triethanolamine, sorbitol, or ethylene glycol. However, the main drawback of these formaldehyde-free binder solutions is their low pH which is often not compatible with other coatings and/or causes corrosion of processing equipment.

Thus, what is needed is an improved coated fibrous substrate which: does not emit environmental irritants such as formaldehyde; is sag resistant while at the same time maintains a high modulus; is compatible with other coatings and fillers; and avoids corroding processing equipment

BRIEF SUMMARY

The coated fibrous panel of the invention comprises a fibrous substrate and a formaldehyde-free coating applied to a major surface of the fibrous substrate. The coating includes a binder system having a neutralized polycarboxy polymer and a polyol crosslinker. The coating has a pH of 6 or greater and is capable of hygroscopic expansion at high humidity to resist sag. The improvement is that the coating is neutralized with a volatile base which evaporates quickly so as not to hinder the crosslinking reaction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The present invention is a formaldehyde-free coating that can be applied to a major surface of a fibrous substrate to impart resist sag resistance while maintaining a high modulus. The coating has neutral or mild alkaline pH of about 6 or greater, and preferable from about 6 to about 10, such that the coating is compatible with other coatings, various fillers, and processing equipment. The preferred coating binder system includes at least one polycarboxy polymer neutralized with a volatile base and at least one polyol capable of crosslinking the neutralized polycarboxy polymer. More specifically, the polyol crosslinks the polycarboxy polymer to form three dimensional networks which have a high modulus and are capable of hygroscopic expansion to inhibit sag. The molar ratio between carboxyl groups in the polycarboxy polymer to hydroxyl groups in the polyol is from about 1:0.2 to about 1:8.

The polycarboxy polymers are homopolymers or copolymers which contain multi carboxyl groups. The polycarboxy polymers are synthesized from monomers with at least one monomer containing carboxyl groups. Suitable monomers containing carboxyl groups include acrylic acid, methacrylic acid, maleic acid, fumaric acid, maleic anhydride, etc. Suitable monomers containing no carboxyl groups include styrene, ethylene, propylene, acrylate esters, etc. The preferred polycarboxy polymers are polyacrylic acid which is synthesized from only acrylic acid monomer.

The polycarboxy polymers are neutralized in aqueous solutions with a volatile base so as not to hinder the crosslinking reaction and, thus, avoiding any detriment to sag performance. Aqueous ammonia is the preferred choice of volatile base because ammonia will evaporate quickly and will allow faster curing. Additionally, the coating binder should be free from any single or multi-valence metal ions such as sodium, potassium, calcium, etc. Unexpectedly, any significant amount of those ions in the coating was found to also hinder the crosslinking reaction. The coating binder therefore preferably has a metal ion concentration of less than 1000 ppm and more preferably less than 500 ppm.

Polyols from renewable resources are particularly preferred due to their renewability, low toxicity, and low cost. The most favorable renewable polyols includes glycerol, dextrose, fructose, sucrose, and sorbitol, etc. Polyols are polyhydric alcohols containing two or more hydroxyl groups. The polyol crosslinkers include secondary alkanolamine (such as diethanolamine, ethyl diethanolamine, methyl diethanolamine, etc.), tertiary alkanolamine (such as triethanolamine), glycerol, glucose (i.e., dextrose), fructose, sucrose, sorbitol, resorcinol, catechol, pyrogallol, glycollated ureas, polyvinyl alcohol, 1,4-cyclohexane diol, pentaerythritol, ethylene glycol, diethylene glycol, triethylene glycol, hydroxyl terminated polyethyleneoxide, trimethylol propane, or a mixture thereof.

The molar ratio between carboxyl groups in the polycarboxy polymer to hydroxyl groups in the polyol affect the crosslinking density, coating modulus, coating hygroscopic properties, and the sag resistance property. Therefore, the carboxyl to hydroxyl molar ratio of can be manipulated to optimize the desired end properties. The preferred carboxyl to hydroxyl molar ratio is from about 1:0.2 to about 1:8.

Hygroscopic expansion and sag resistant properties can be further modulated with filler addition level. The fillers should be insensitive to moisture which can then dampen the hygroscopic expansion at high humidity. Also, the fillers preferably have a high modulus which, in turn, can improve the cured coating modulus. A variety of fillers can be used either organic or inorganic. Suitable inorganic fillers include limestone, clay, sand, mica, perlite, diatomaceous earth, feldspar, talc, glass beads, etc. Suitable organic fillers include hard plastic powders such as polycarbonate, polyesters, nylon, polypropylene, polyethylene, etc.

EXAMPLES

Example 1

The waterborne coating BC #1 was made in the following procedure: 247.0 g ammonium polyacrylic acid (38% w/w) was added into a mixer containing 521.8 g water. While mixing, 102.5 g Dextrose, 1.0 g Tergitol TMN-6 (wetting agent), 2.6 g defoamer, 1.2 g biocide, and 1519.7 g filler slurry were added in sequence to the mixer. The finished coating had solids content of 55%, Brookfield viscosity of 3.400 cps, pH of 8.9, and filler to binder (F:B) ratio of 6:1.

The coating was applied by spray to the back side of three types of ceiling panels. They all contain different levels of reinforcing fibers (either mineral wool or glass fiber). Panel #3 was a kilned product containing additional clays. The dry application weight was 10 grams per square foot. In order to balance the ceiling tile stress caused by drying the back coating a prime coating (PC #1) comprising a filler to binder ratio of 5:1 and 50% solids was also applied to the face of ceiling panel with dry application weight at about 10 grams per square foot. The sprayed panel was then dried and cured at 410° F. for 10 minutes in an oven. The coated panels were then cut into 24" by 3" strips to test for sag at 82° F. and RH loop of 35% to 90% to 35% for 2 cycles (24 hours per cycle). The final sag is a projected value at $4^{th}$ cycle. The sag data were then converted using empirical factors to 2'×2' and 2'×4' of full panel sizes.

As shown in Table I are modulus of elasticity (MOE), modulus of rupture (MOR), formaldehyde emission (CA 1350), and sag data of all three base panels before coating applications. It is shown in Table I that modulus of rupture (MOR) and modulus of elasticity (MOE) increase with increasing the level of mineral wool fiber or glass fiber. That clearly indicates that the panel gets stronger as increasing reinforcing fibers. The kilned panel #3 (containing most wool fiber and additional clays) is the strongest of all. The bare Panel #1 with minimal reinforcing fiber sagged the worst. Sag of bare panels was improved as the mechanical strength was improved. Panel #3 had no sag since it is essentially non-hygroscopic. Therefore, the panels with poor mechanical property will need special coatings to improve their sag resistance while there is no such need for kilned Panel #4.

TABLE I

Summary of test results for Examples 1-2 and Comparative Examples 1-2

| Bare Panel Property | Panel ID | | |
|---|---|---|---|
| | Panel #1 | Panel #2 | Panel #3 |
| Panel Construction (Reinforcing Fiber %) | Ca. 10% | Ca. 30% | Ca. 40-50% (Kilned w/clay) |
| MOE (psi) | 15480 | 19180 | 116500 |
| MOR (psi) | 76 | 96 | 223 |
| Formaldehyde Emission Factor (CA-1350 µg/m²hr) | — | — | Non-detectable |
| Sag (2' × 4') | −598 | −404 | −75 |
| Example 1 | (BC #1/ PC #1) | (BC #1/ PC #1) | (BC #1/ PC #1) |
| Coatings F:B Ratio | 6:1 | 6:1 | 6:1 |
| Sag (2' × 2') (Requirement => −150) | −98 | −103 | −8 |
| Sag (2' × 4') (Requirement => −200) | −210 | −186 | −21 |
| Example 2 | (BC #2/ PC #1) | (BC #2/ PC #1) | (BC #2/ PC #1) |
| Coatings F:B Ratio | 2:1 | 2:1 | 2:1 |
| Formaldehyde Emission Factor (CA-1350 µg/m²hr) | — | — | Non-detectable |
| Sag (2' × 2') (Requirement => −150) | −52 | −32 | −15 |
| Sag (2' × 4") (Requirement => −200) | −131 | −72 | −38 |
| Comparative Example 1 | (BC #3/ PC #1) | (BC #3/ PC #1) | (BC #3/ PC #1) |

TABLE I-continued

Summary of test results for
Examples 1-2 and Comparative Examples 1-2

| Bare Panel Property | Panel ID | | |
|---|---|---|---|
| | Panel #1 | Panel #2 | Panel #3 |
| Coatings F:B Ratio | 0:1 | 0:1 | 0:1 |
| Sag (2' × 2') (Requirement => −150) | −228 | −219 | −16 |
| Sag (2' × 4') (Requirement => −200) | −489 | −367 | −39 |
| Comparative Example 2 | (BC #4/ PC #2) | | |
| Coatings F:B Ratio | 0:1 | | |
| Sag (2' × 2') (Requirement => −150) | −212 | | |
| Sag (2' × 4') (Requirement => −200) | −535 | | |

When panels were coated with BC #1 and PC #1 their sag behaviors changed depending on the level of reinforcing fibers. As before sag results improved with increasing reinforcing fibers in the panel. Table 1 shows that for Panel #2 the BC #1 coating satisfied sag resistance for both the 2×2' and 2×4' sizes. For Panel #1, the BC #1 coating satisfied sag resistance for 2×2', but did not provide enough sag resistance for the 2'×4' panel size due to its wider span.

Example 2

The waterborne coating BC #2 was made in the following procedure: 576.0 g ammonium polyacrylic acid (38% w/w) was added into a mixer containing 387.8 g water. While mixing, 239.3 g Dextrose, 1.0 g Tergitol TMN-6, 2.6 g defoamer, 1.2 g biocide, and 1187.5 g filler slurry were added in sequence to the mixer. The finished coating had solids content of 55%. Brookfield viscosity of 1,100 cps, pH of 8.9, and filler to binder (F:B) ratio of 2:1. Following the same coating application, coating curing, and panel sag testing procedure as described in Example 1 three different ceiling panels were evaluated using this back coating. The converted sag data are shown in Table I.

Formaldehyde emission testing using the California CA 1350 method has shown that Panel #3 with BC #2 coating and bare Panel #3 both had non-detectable emissions levels. Therefore, the BC #2 coating did not add detectable formaldehyde emissions in this test. These panels would easily met the formaldehyde emission limit of 18.9 μg/m² hr in the Collaborative for High Performance Schools (CHPS) code. From Table I it has clearly shown that BC #2 formula has better sag resistance than BC #1 formula for the 2'×4' panels. However, panel cupping became an issue if BC #2 formula is used for the 2'×2' panel size.

Comparative Example 1

The waterborne coating BC #3 was made in the following procedure: 1557.6 g ammonium polyacrylic acid (38% w/w) was added into a mixer containing 177.4 g water. While mixing, 647.0 g Dextrose, 2.6 g defoamer, and 1.2 g biocide were added to the mixer. The finished coating had solids content of 50%, Brookfield viscosity of 170 cps, pH of 9.6, and filler to binder (F:B) ratio of 0:1. Following the same coating application, coating curing, and panel sag testing procedure as described in Example 1 three different ceiling panels were evaluated using this back coating. The converted sag data are shown in Table I.

When a formula without fillers was used in ceiling Panels #1 and #2, the reinforcing effect of fillers was lost and the coating did not provide the panels with adequate panel sag performance. This clearly indicates that fillers are very helpful to reinforce the strength of the binder.

Comparative Example 2

The waterborne coating BC #4 was made in the following procedure: 265.3 g Rhoplex GL 720 latex (acrylic base. Tg=95° C., 50% solids) was added into a mixer containing 81.2 g water. While mixing, 0.1 g tetra-sodium polyphosphate, 1568.2 g Kaolin clay slurry (70% solids), 81.1 Mica, 0.8 g biocide, 1.0 g Rhoplex RM 232 thickener, and 3.2 g defoamer were added in sequence to the mixer. The finished coating had solids content of 65%. Brookfield viscosity of 520 cps, pH of 6.6, and filler to binder (F:B) ratio of about 8:1. Following the same coating application, coating curing, and panel sag testing procedure as described in Example 1 Panel #1 was evaluated using this back coating. A new prime coating PC #2 (16:1 F:B ratio and 50% solids) was used in this comparative example. The converted sag data are shown in Table I.

Panel #1 failed the sag test at both panel sizes although the 2'×2' panels did better than 2'×4' panels. Therefore, on the same cost base the latex based back coating BC #4 had higher sag values than BC #1 and BC #2 and was not adequate enough to resist humidity sag.

TABLE II

Sage results on Panel #1 coated with various coatings

| Bare Panel Property | Example 3 | Example 4 | Example 5 | Example 6 |
|---|---|---|---|---|
| Coating ID | BC #5/ PC #1 | BC #6/ PC #1 | BC #7/ PC #1 | BC #8/ PC #1 |
| F:B ratio | 2:1 | 2:1 | 2.7:1 | 2.5:1 |
| Sag (2' × 4') (Requirement => −200) | −198 | −188 | −180 | −126 |

Example 3

The waterborne coating BC #5 was made in the following procedure: 328.0 g SMA-1000H from Sartomer Co. was added into a mixer containing 291.0 g water. While mixing, 38.0 g glycerol, 1.0 g defoamer, 1.0 g biocide, and 340.0 g Kaolin clay were added into the mixer. The resulting coating had 50% solids, 630 cps Brookfield viscosity, and filler to binder ratio of 2:1. Following the same coating application, coating curing, and panel sag testing procedure as described in Example 1 Panel #1 (with about 10% reinforcing fiber) was tested using this coating. The coated panel had a sag value of −198 mils after 4 humidity cycles as shown in Table II.

Example 4

The waterborne coating BC #6 was made in the following procedure: 227.2 g SMA-1000H was added into a mixer containing 352.7 g water. While mixing, 76.6 g dextrose (glucose), 1.0 g defoamer, 1.0 g biocide, and 340.0 g Kaolin clay were added into the mixer. The resulting coating had 50% solids, 2700 cps Brookfield viscosity, 8.9 pH, and filler to binder ratio of 2:1. Following the same coating application, coating curing, and panel sag testing procedure as described in Example 1 Panel #1 was tested using this coating. This coated panel had a sag value of −188 mils after 4 humidity cycles as shown in Table II.

Example 5

The waterborne coating BC #7 was made in the following procedure: 346.8 g SMA1000H was added into a mixer containing 377.9 g water. While mixing, 22.1 g triethanolamine (TEA), 1.0 g defoamer, and 440.9 g Kaolin clay were added into the container. The finished coating had filler to binder ratio of 2.7:1, 50% solids, 1260 cps Brookfield viscosity, and 8.9 pH. Following the same coating application, coating curing, and panel sag testing procedure as described in Example 1 Panel #1 was tested using this coating. This coated tile had a sag value of −180 mils after 4 humidity cycles as shown in Table II.

Example 6

The waterborne coating BC #8 using a commercial thermoset binder GP364G17 from Georgia-Pacific. Inc. based on polycarboxy polymer and polyol was made as follows: 449.4 g GP364G17 was added into a mixer containing 445.0 g water. While mixing, 1.2 g defoamer, 1.0 biocide, and 503.0 g kaolin clay were added into the mixer. The resulting coating had filler to binder ratio of 2.5:1, 50% solids, 720 cps Brookfield viscosity, and 8.0 pH. Following the same coating application, coating curing, and panel sag testing procedure as described in Example 1 Panel #1 was tested using this coating. This coated tile had a sag value of −126 mils after 4 humidity cycles as shown in Table II.

The foregoing illustrates some of the possibilities for practicing the invention. Many other embodiments are possible within the scope and spirit of the invention. For example, although the coating is described herein as being incorporated in a ceiling tile structure, it will be appreciated by those skilled in the art, however, that the coating may have other applications, for example, in the building, furniture, or automotive industry. It is, therefore, intended that the foregoing description be regarded as illustrative rather than limiting, and that the scope of the invention is given by the appended claims together with their full range of equivalents

What is claimed is:

1. A coating composition for application to a building panel, the coating composition comprising a blend of:
    a polymeric binder comprising polyacrylic acid;
    a filler;
    a crosslinker that is a polyol selected from the group consisting of glycerol, dextrose, sucrose, fructose, sorbitol, and combinations thereof;
    a neutralizing agent; and
    a liquid carrier;
    wherein the coating composition is formaldehyde-free and has a pH ranging from about 8.0 to about 8.9; and
    wherein the filler and the polymeric binder are present in a weight ratio ranging from about 2:1 to about 6:1.

2. The coating composition according to claim 1, wherein the liquid carrier comprises water.

3. The coating composition according to claim 2, wherein the liquid carrier is present in an amount of about 45 wt. % to about 50 wt. % based on the total weight of the coating composition.

4. The coating composition according to claim 1, wherein the coating composition has a metal ion concentration of less than 1000 ppm.

5. The coating composition according to claim 4, the metal ion concentration is less than 500 ppm.

6. An aqueous coating composition for application to a building panel, the coating composition comprising a blend of:
    a polymeric binder that is a polyacrylic acid;
    a crosslinker that is a polyol selected from the group consisting of glycerol, dextrose, sucrose, fructose, sorbitol, and combinations thereof;
    a neutralizing agent;
    a filler;
    wherein the aqueous coating composition has a pH of about 8.0; and
    wherein a weight ratio of the filler to the polymeric binder is from about 2:1 to about 6:1, and the aqueous coating composition has a metal ion concentration of less than 1000 ppm.

7. The aqueous coating composition of claim 6, wherein the aqueous coating composition is free of mica.

8. The aqueous coating composition of claim 6, wherein the neutralizing agent comprises a volatile base.

9. The aqueous coating composition of claim 8, wherein the volatile base is aqueous ammonia.

10. The aqueous coating composition of claim 6, wherein the filler is selected from inorganic fillers, organic fillers and combinations thereof.

11. The aqueous coating composition of claim 10, wherein the filler comprises inorganic fillers selected from limestone powder, clay, sand, mica, perlite, diatomaceous earth, feldspar, talc and glass beads.

12. The aqueous coating composition of claim 10, wherein the filler comprises organic filler that includes hard plastic powders.

13. A coating composition for application to a building panel, the coating composition comprising a blend of:
    a polymeric binder that is polyacrylic acid and that is at least partially neutralized with a volatile base;
    a polyol crosslinker selected from the group consisting of diethanolamine, triethanolamine, glycerol, dextrose, sucrose, fructose, sorbitol, and combinations thereof;
    a nonionic surfactant comprising a secondary alcohol ethoxylate;
    a liquid carrier;
    a filler; and
    wherein the coating composition is free of mica;
    wherein the coating composition is formaldehyde-free and is free of any single or multi-valence metal ions selected from sodium, potassium, and calcium;
    wherein the coating composition has a pH ranging from about 8.0 to about 8.9; and
    wherein a weight ratio of the filler to the polymeric binder ranges from about 2:1 to about 6:1.

14. The coating composition according to claim 13, wherein the volatile base is aqueous ammonia.

15. The coating composition according to claim 1, wherein the coating composition further comprises a nonionic surfactant that is a secondary alcohol ethoxylate.

16. The coating composition according to claim 6, wherein the coating composition further comprises a nonionic surfactant that is a secondary alcohol ethoxylate.

17. The coating composition according to claim 1, wherein the weight ratio of the filler and the polymeric binder ranges from about 2:1 to about 2.7:1.

18. The coating composition according to claim 6, wherein the weight ratio of the filler to the polymeric binder ranges from about 2:1 to about 2.7:1.

19. The coating composition according to claim 13, wherein the weight ratio of the filler to the polymeric binder ranges from about 2:1 to about 2.7:1.

* * * * *